(12) United States Patent
Hsu (10) Patent No.: US 7,684,173 B2
(45) Date of Patent: Mar. 23, 2010

(54) OPTICAL GUIDING DEVICE AND BACKLIGHT MODULE USING SAME

(75) Inventor: Ming-Fu Hsu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 48 days.

(21) Appl. No.: 11/956,351

(22) Filed: Dec. 14, 2007

(65) Prior Publication Data

US 2009/0109706 A1   Apr. 30, 2009

(30) Foreign Application Priority Data

Oct. 24, 2007   (CN)   ................ 2007 1 0202236

(51) Int. Cl.
*F21V 7/04* (2006.01)
(52) U.S. Cl. .................. 361/611; 362/555; 362/561
(58) Field of Classification Search ......... 362/600–634, 362/551, 552, 553, 555
See application file for complete search history.

(56) References Cited

U.S. PATENT DOCUMENTS 5,301,090 A * 4/1994 Hed ............................ 362/558
5,839,813 A * 11/1998 Smith .......................... 362/551
6,464,366 B1 * 10/2002 Lin et al. ..................... 362/616
6,637,924 B2 * 10/2003 Pelka et al. .................. 362/555
6,789,910 B2 * 9/2004 Kimura et al. ............... 362/600
7,419,287 B2 * 9/2008 Gasquet ...................... 362/511

* cited by examiner

Primary Examiner—Anabel M Ton
(74) Attorney, Agent, or Firm—Frank R. Niranjan (57) ABSTRACT

An exemplary optical guiding device for optically coupling a plurality of light beams having at least one laser beam, includes a light coupling lens, a light collimating lens, and an optical fiber. The light coupling lens and the light collimating lens are positioned apart along an optical path. The optical fiber is optically coupled to the light couple lens. External laser beam introduced by the optical fiber are optically coupled by the light coupling lens for collimating and mixing the light beams, then collimated by the at least one light collimating lens, and finally emitting out. A backlight module using the optical guiding device with colored semiconductor lasers and light transferring device are also provided. The backlight module has a good color performance, such as high color saturation.

17 Claims, 13 Drawing Sheets

OPTICAL GUIDING DEVICE AND BACKLIGHT MODULE USING SAME

BACKGROUND OF THE INVENTION

1. Field of the Invention

The present invention relates to optical guiding devices, particularly, to an optical guiding device guiding at least a laser beam, and backlight modules using the optical guiding device.

2. Discussion of the Related Art

In a liquid crystal display device (LCD device), a liquid crystal is a substance that does not illuminate light by itself. Instead, the liquid crystal propagates (transmits) light received from a light source to display information. In the case of a typical liquid crystal display device, a backlight module powered by electricity supplies the needed light.

With the development of LCD technology, large-size LCD devices have been actively sought and researched. The larger the backlight modules, the higher the power consumption and the materials needed. To minimize the power consumption of the larger LCD devices, the backlight module of the larger LCD devices would usually employ fewer light sources. However, decreasing the light sources would decrease the optical performance of the backlight module, such as brightness, light output uniformity, and so on. Thus, affecting the display performance of the large-size LCD. Typically, backlight modules are classified into an edge lighting type or a bottom lighting type based upon the position of the light sources in the LCD devices. By employing the edge lighting type backlight module allows the LCD to adopt a thinner width, most of the large-size LCD devices employ the edge lighting type backlight module.

Figure 13:
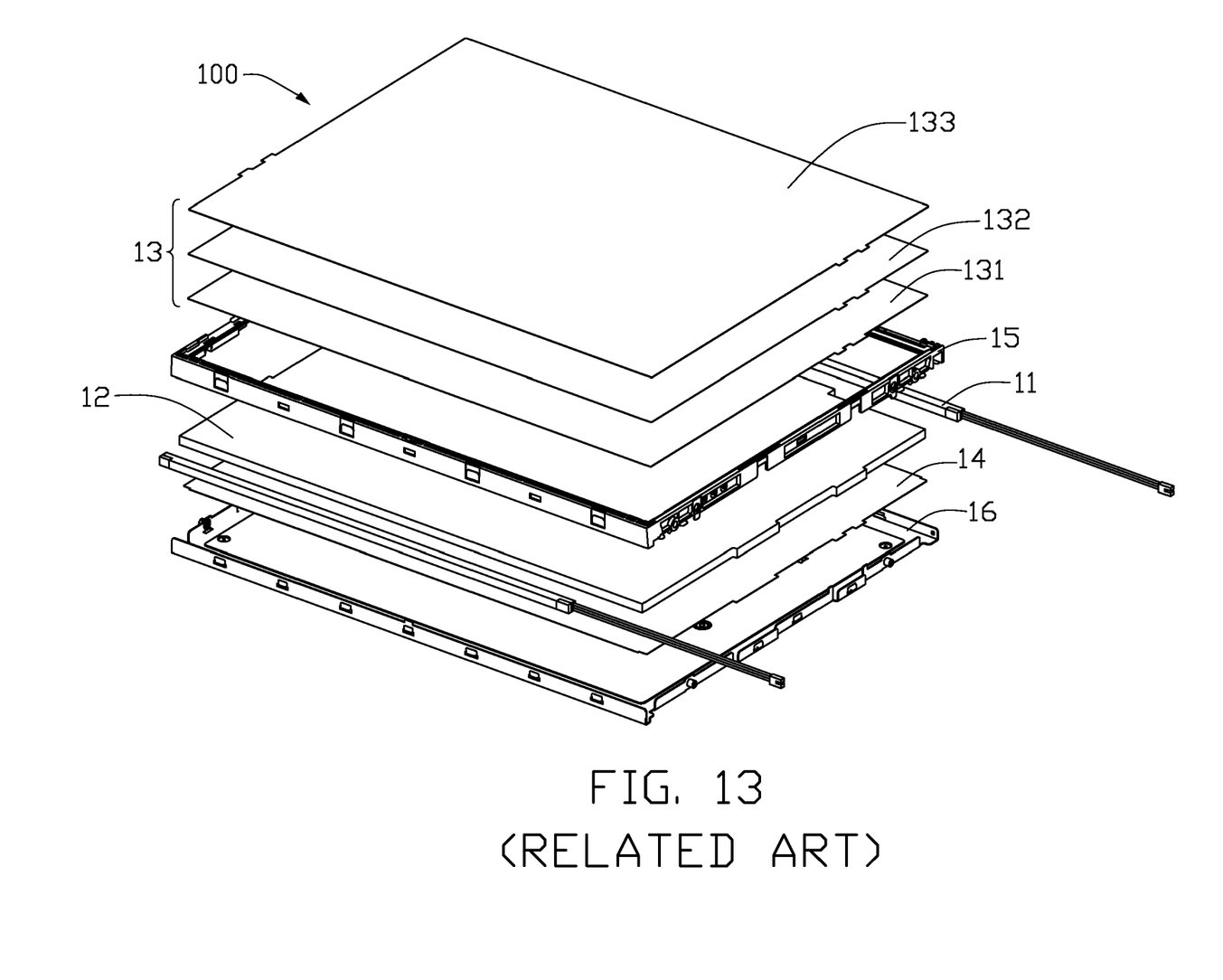
FIG. 13 is an exploded, isometric view of a conventional backlight module.

Referring to FIG. 13, a typical edge lighting type backlight module 100 includes two cold cathode fluorescence lamps (CCFLs) 11, a light guide plate 12, a plurality of complementary optical elements 13, a light reflective sheet 14, a receiving frame 15 and a bottom frame 16. The two CCFLs 11 are disposed adjacent to two opposite side surfaces of the light guide plate 12. The optical elements 13 include a first light diffusion sheet 131, a prism sheet 132, and a second diffusion sheet 133 stacked on the light guide plate 12 in that order. The light reflective sheet 14 is positioned under the light guide plate 12. The receiving frame 15 and the bottom frame 16 cooperatively form a receiving space. The CCFLs 11, the light guide plate 12, the optical elements 13 and the light reflective sheet 14, are assembled in the receiving space together.

Generally, an optical efficiency of a CCFL is relatively high, however, the volume of the CCFL is large and the power consumption of the CCFL is high. Furthermore, CCFL only covers about 75 percent of color saturation as defined by the National Television Standards Committee (NTSC). Therefore, the CCFL cannot satisfy high quality liquid crystal display requirements.

What is needed, therefore, is a new backlight module that overcomes the above mentioned disadvantages.

SUMMARY

An optical guiding device for optically coupling a plurality of light beams having three laser beam according to a preferred embodiment, includes a light coupling lens, a light collimating lens, and three optical fibers. The light coupling lens and the light collimating lens are positioned apart along an optical path. The optical fibers are optically coupled to the light couple lens. External laser beam introduced by the optical fiber are optically coupled by the light coupling lens for collimating and mixing the light beams, then collimated by the light collimating lens, and finally emitting out.

A backlight module includes a plurality of light sources having three colored semiconductor lasers, a light guide plate, a light transferring device and an optical guiding device. The optical guiding device is same as described in a previous paragraph. The optical guiding device and the light transferring device are position near the light guide plate. Laser beam from the three colored semiconductor lasers are optically coupled by the light coupling lens for collimating and mixing the light beams, then collimated by the light collimating lens, and finally are reflected and redirected by the light transferring device to enter the light guide plate.

Other advantages and novel features will become more apparent from the following detailed description of the preferred embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical guiding device and backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical guiding device and backlight module using the optical guiding device, in detail.

Figure 1:
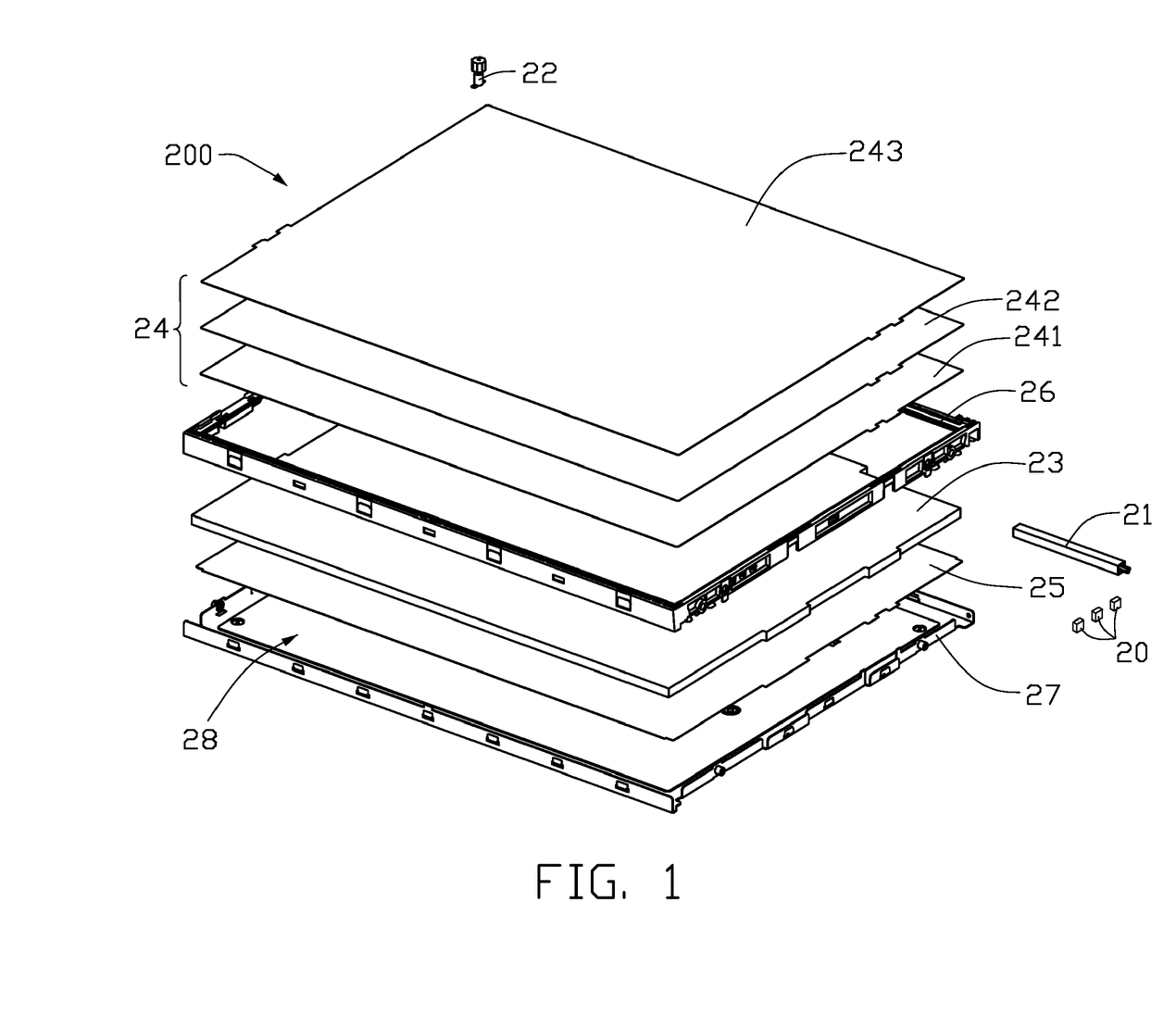
FIG. 1 is an exploded, isometric view of a backlight module according to a first preferred embodiment of the present invention, the backlight module having an optical guiding device and a light transfer unit.

Referring to FIG. 1, a backlight module 200 in accordance with a first preferred embodiment of the present invention is shown. The backlight module 200 includes three colored semiconductor lasers 20, an optical guiding device 21, a rotating reflector apparatus 22, a light guide plate 23, a plurality of complementary optical elements 24, a light reflective sheet 25, a receiving frame 26, and a bottom frame 27.

The optical guiding device 21 is on a side of the light guide plate 23, and the rotating reflector apparatus 22 are disposed in a corner on the same side. The optical elements 24 include a first light diffusion sheet 241, a prism sheet 242, and a second diffusion sheet 243 stacked on the light guide plate 23 in that order. The light reflective sheet 25 is positioned under the light guide plate 23. The receiving frame 26 and the bottom frame 27 cooperatively form a receiving space 28. The colored semiconductor lasers 20, the optical guiding device 21, the rotating reflector apparatus 22, the light guide plate 23, the optical elements 24, and the light reflective sheet 25 are all assembled in the receiving space 28.

Figure 2:
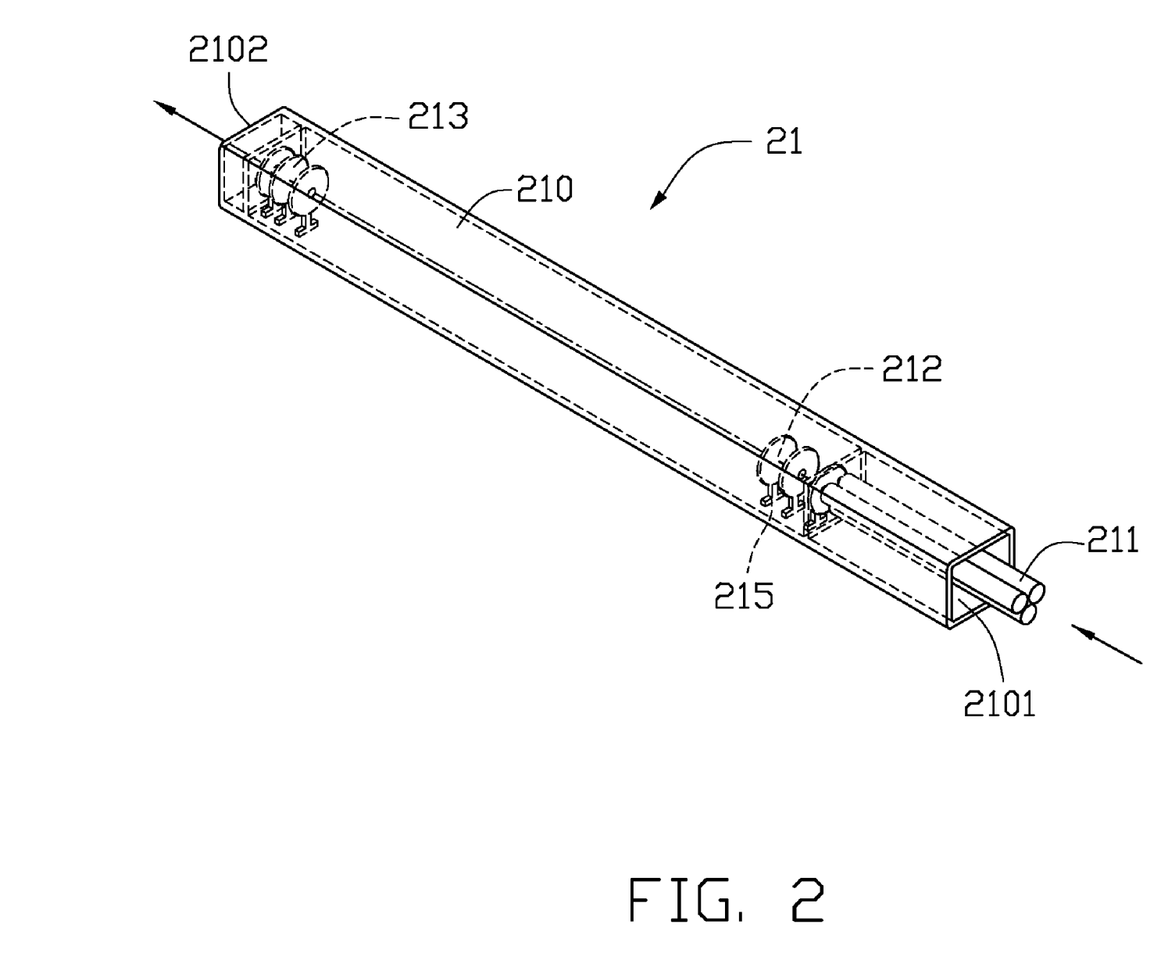
FIG. 2 is an isometric view of the optical guiding device of FIG. 1, the optical guiding device having three light collimating lenses.

Referring to FIG. 2, in the first embodiment, the optical guiding device 21 includes a casing 210, three optical fibers 211, three light coupling lenses 212, and three light collimating lenses 213. The casing 210 is substantially an oblong cuboid defining a hollow cavity communicating with opposite ends of the casing 210, thus defining a light input opening 2101 and a light output opening 2102 correspondingly. The light input opening 2101 and the light output opening 2102 are located at opposite ends of the casing 210. Each of the three light coupling lenses 212 is disposed on a lens support 215 that extends out of the casing 210 adjacent to the light input opening 2101. The light coupling lenses 212 and the lens supports 215 are arranged in the casing 210 such that the focal points of the light coupling lenses 212 are aligned. Each of the three collimating lenses 213 is disposed on other lens support 215 that extends out of the casing 210 adjacent to the light output opening 2102. The focal points of the light coupling lenses 212 and the light collimating lenses 213 lie on a same optical path in the casing 210 (for example, a center axis of the casing 210). An end of each of the three optical fibers 211 is optically coupled to the light coupling lens 212 adjacent to the light input opening 2101 correspondingly. The other end of the three optical fibers 211 is optically connected to the three colored semiconductor lasers 20 (such as red, blue, green semiconductor lasers) respectively.

Figure 3:
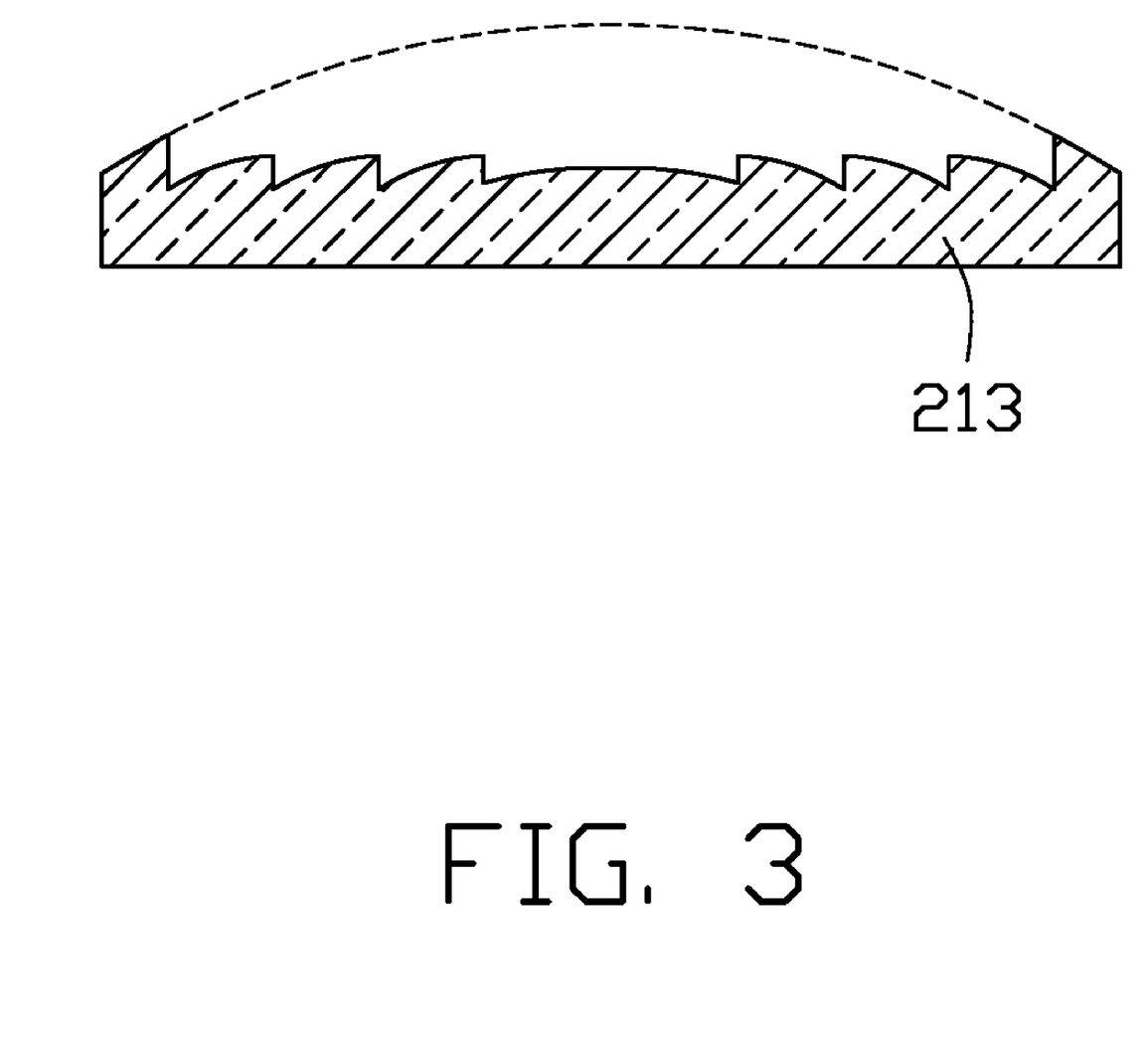
FIG. 3 is a cross-sectional view of the light collimating lens of FIG. 2.

Referring to FIG. 3, the light collimating lenses 213 are Fresnel lenses. In use, laser beams from the colored semiconductor lasers are projected into the optical fibers 211 and out toward the optical guiding device 21, then the laser beams are optically coupled together by the three light coupling lenses 212 that collimate and mix the laser beams. Finally the laser beams are collimated again by the three light collimating lenses 213 and exit out through the light output opening 2102 of the casing 210.

Figure 4:
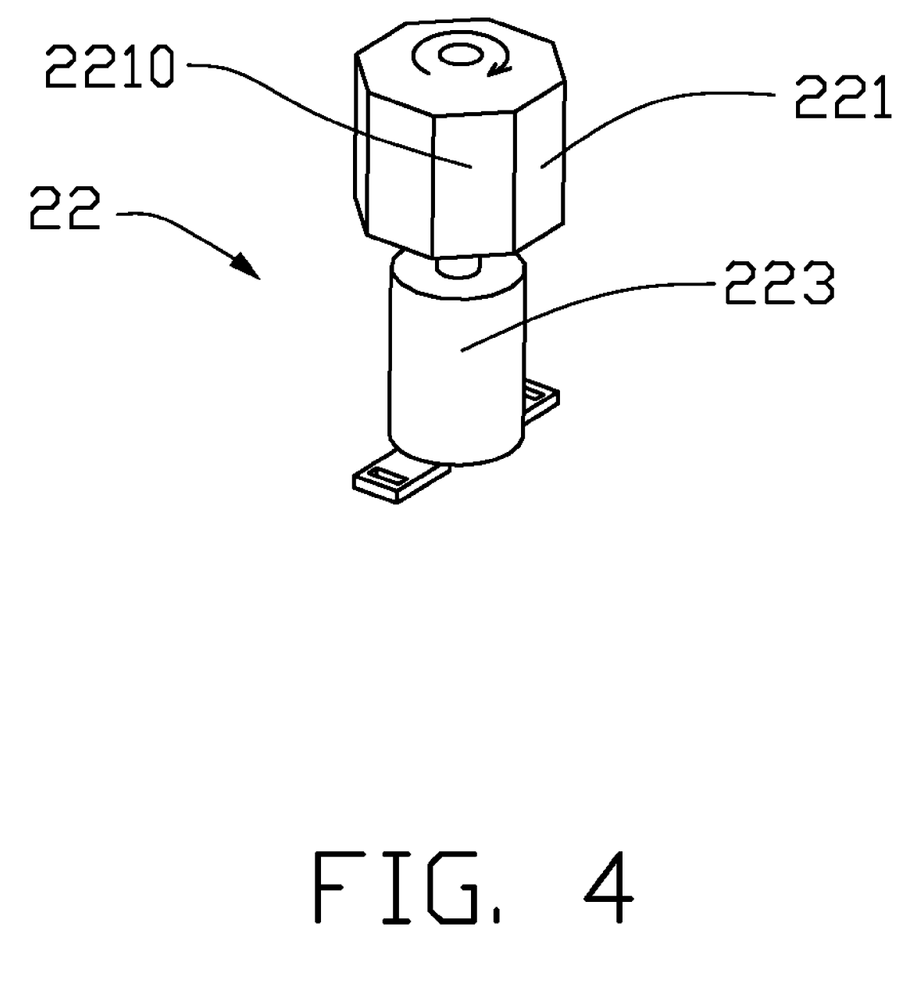
FIG. 4 is an isometric view of the light transfer unit of FIG. 1.

Referring to FIG. 4, the rotating reflector apparatus 22 includes a multi-faced prism 221 and a server motor 223. The vertical side of the multi-faced prism 221 is attached to the rotor of the sever motor 223 such that a center of axis of the multi-faced prism 221 is aligned with the rotational axis of the rotor. The server motor 223 is configured for rotating the multi-faced prism 221 at predetermined rotation per minute (rpm). In the illustrated embodiment, the multi-faced prism 221 is an eight-faced prism having eight reflective lateral faces. In the preferred embodiment, the lateral faces are mirrors.

Figure 5:
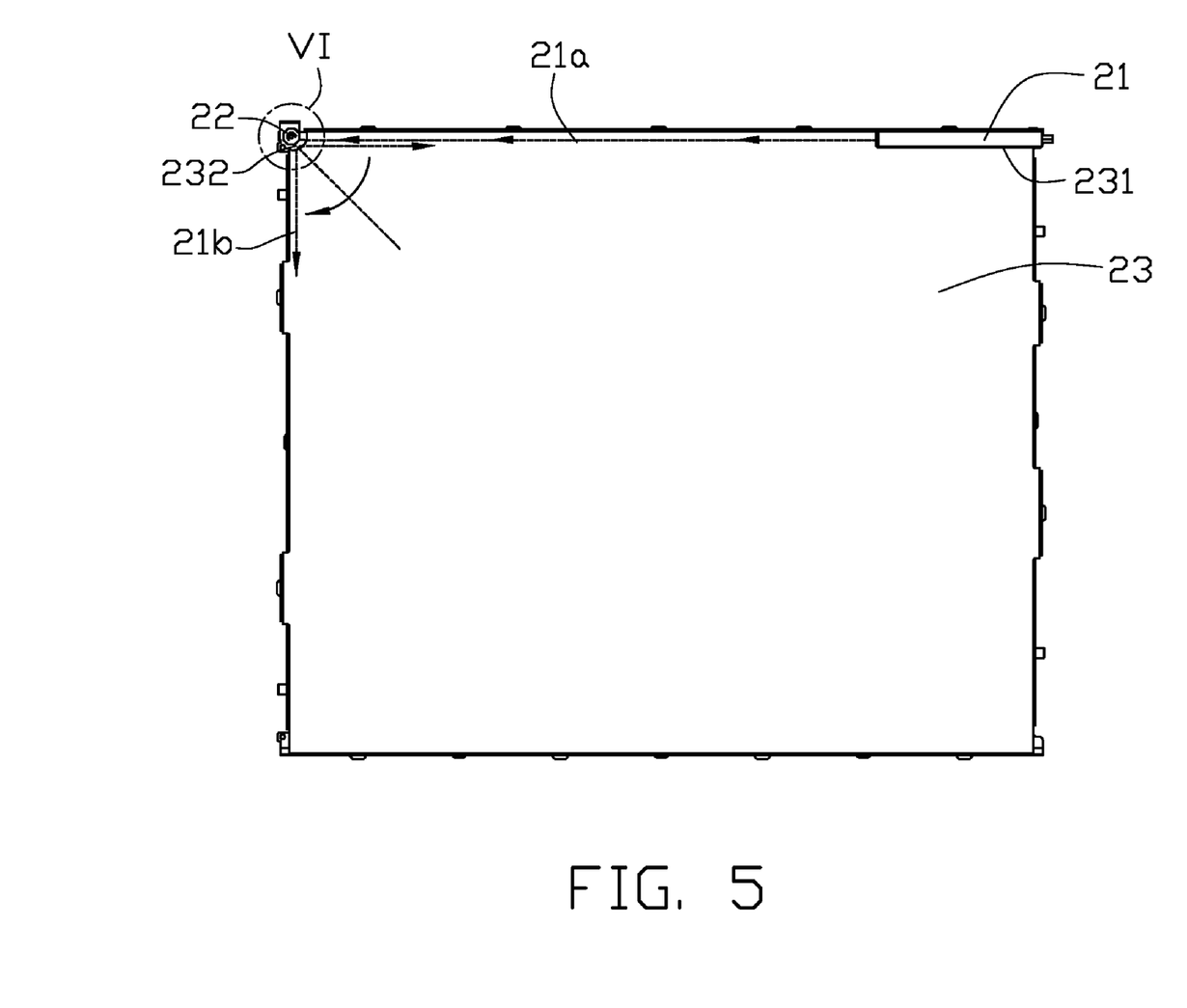
FIG. 5 is a top plan view of the backlight module of FIG. 1.
Figure 6:
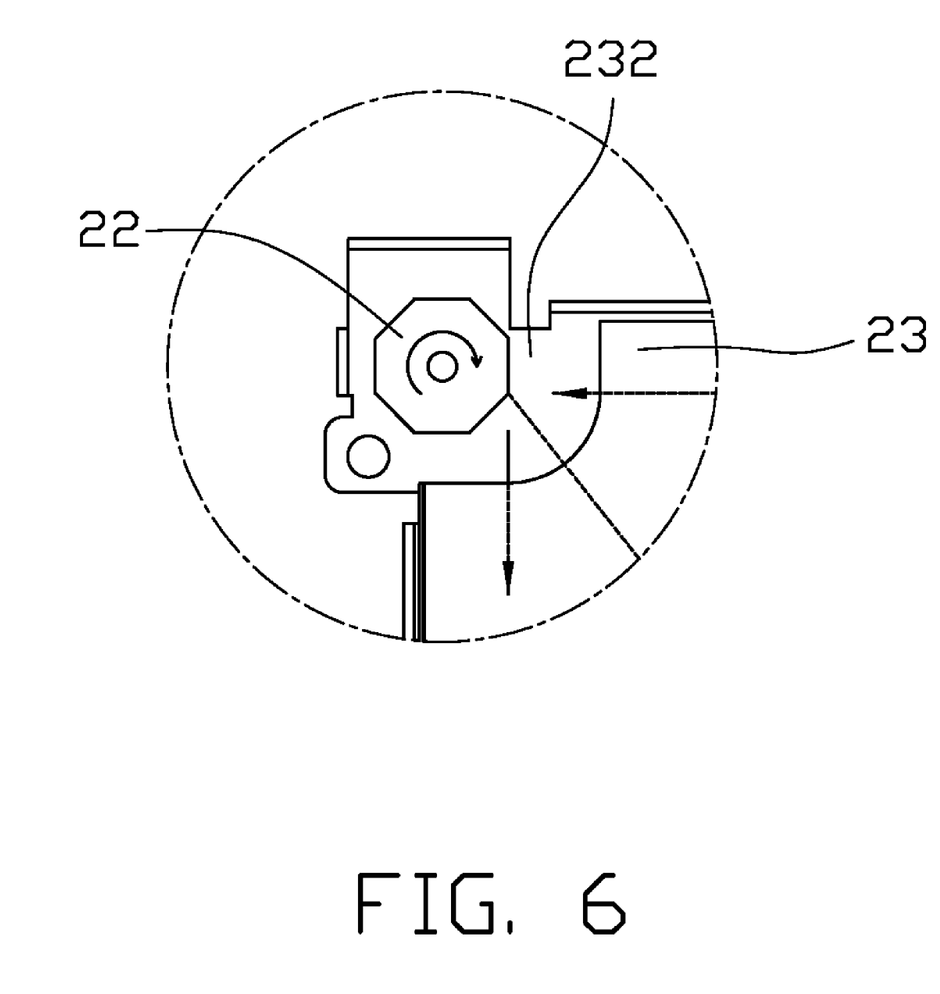
FIG. 6 is an enlarged view of a circle portion VI of FIG. 5.

Referring to FIGS. 5 and 6, in the first embodiment, the adjacent corners of the same side of the light guide plate 23 defines a first cutout 231 and a second cutout 232 correspondingly. The first cutout 231 is elongated rectangular in shape. The second cutout 232 defines a curved-shaped corner. The rotating reflector apparatus 22 is disposed in the second cutout 232 and the optical guiding device 21 is disposed in the first cutout 231 facing the rotating reflector apparatus 22. In use, the rotating multi-faced prism 221 of the rotating reflector apparatus 22 reflects the focused light beams (21a, 21b) from the optical guiding device 21 into the light guide plate 23.

It should be pointed out, the colored semiconductor lasers 20 can be positioned outside the receiving space 28, as long as the colored semiconductor lasers 20 are connected to the optical guiding device 21 by the optical fibers 211.

In alternative embodiments, the lens supports 215 can be omitted, and the light coupling lenses 212 and the light collimating lens 213 are instead substantially permanently positioned on the casing 210 using glue, or, the light coupling lenses 212 and the light collimating lens 213 are fixed to the casing 210 by using fastener structures formed in the casing 210.

According to the shape of the light guide plate 23, the multi-faced prism 221 of the rotating reflector apparatus 22 can be selected from one of four-faced prism, six-faced prism, twelve-faced prism and so on. For example, if the light guide plate 23 is triangular in shape, the multi-faced prism 221 is preferable to be a twelve-faced prism.

It should be also pointed out that, one or more of colored semiconductor lasers 20 and other light sources, such as colored light emitting diode (LED), can be used in the backlight module 200. Laser beams from the colored semiconductor lasers 20 or other light beams from the LED can be projected into the optical guiding device 21 together. The optical guiding device 21 may have only one light coupling lens 212, and only one light collimating lens 213 to mix and collimate the laser beams and other light beams. Alternatively, referring to FIG. 2 again, between the light coupling lens 212 and the light output opening 2102 of the casing 210 define a space. The space can be filled with solid glue materials for fixing the optical fibers 211 tightly.

Figure 7:
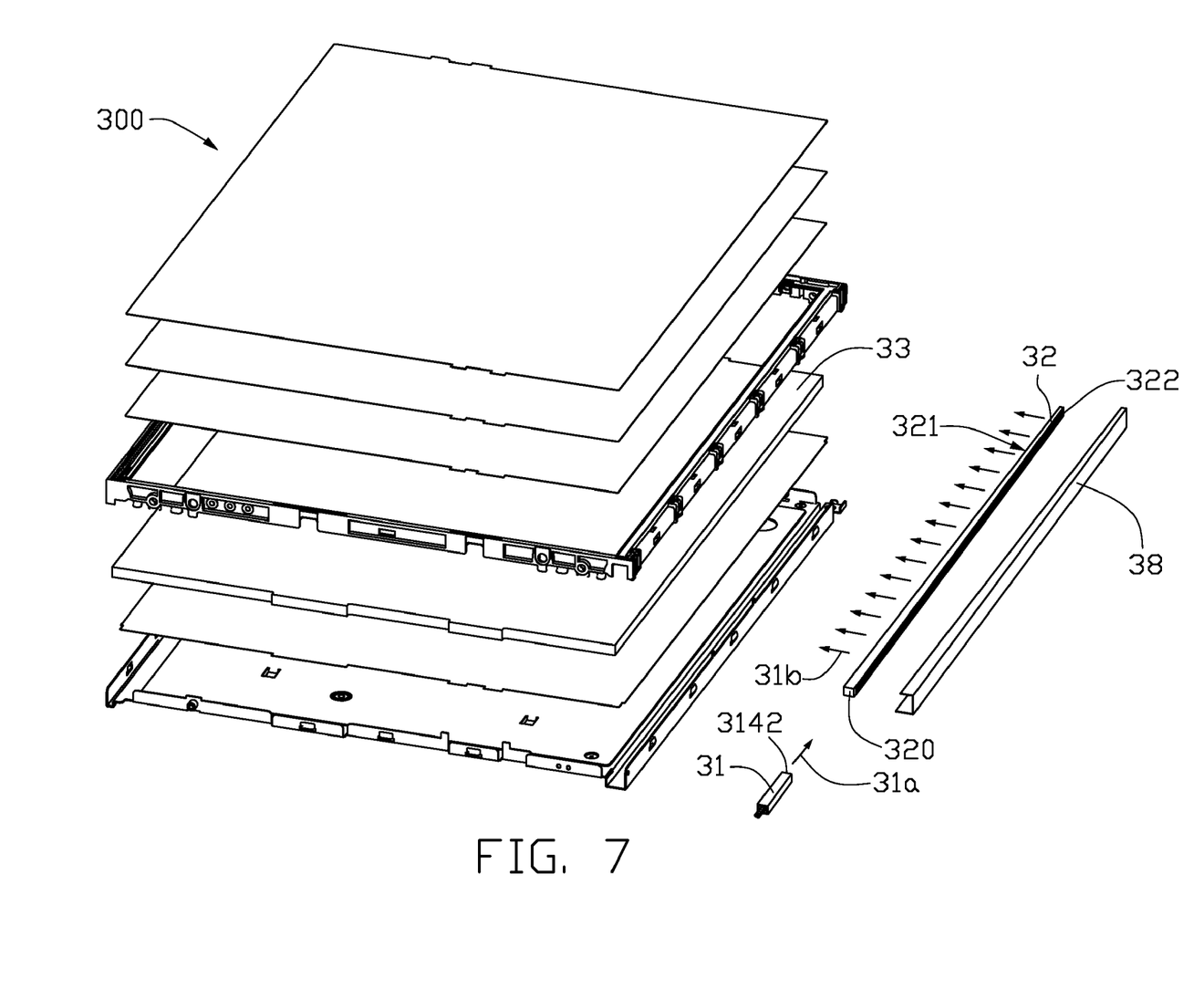
FIG. 7 is an exploded, isometric view of a backlight module according to a second preferred embodiment of the present invention.

Referring to FIG. 7, a backlight module 300, in accordance with a second preferred embodiment of the present invention, is similar in principle to the backlight module 200 of the first embodiment. However, the backlight module 300 has a light guide rod 32 for replacing the rotating reflector apparatus 22 of the backlight module 200. An optical guiding device 31 and the light guide rod 32 are aligned in a line adjacent to one side surface of the light guide plate 33. The light guide rod 32 is wedgy, and includes a light incident surface 320, a light emitting surface 321, and a light reflective surface 322. The light incident surface 320 is an end surface of the light guide rod 32. A light output opening 3142 of the optical guiding device 31 is in contact with light incident surface 320. The light emitting surface 321 adjoins to the light incident surface 320 and faces one side surface of the light guide plate 33. The light reflective surface 322 is opposite to the light emitting surface 321, and also oblique with respect to the light emitting surface 321.

Alternatively, the light reflective surface 322 may be omitted, if the backlight module 300 further includes a reflector 38 partially surrounding the light guide rod 32. In use, laser beams 31a emitted from the optical guiding device 31 enter into the light guide rod 32 via the light incident surface 320, then are reflected by the light reflective surface 322, and finally the laser beams 31b emit out from the light guide rod 32 via the light emitting surface 321.

Figure 8:
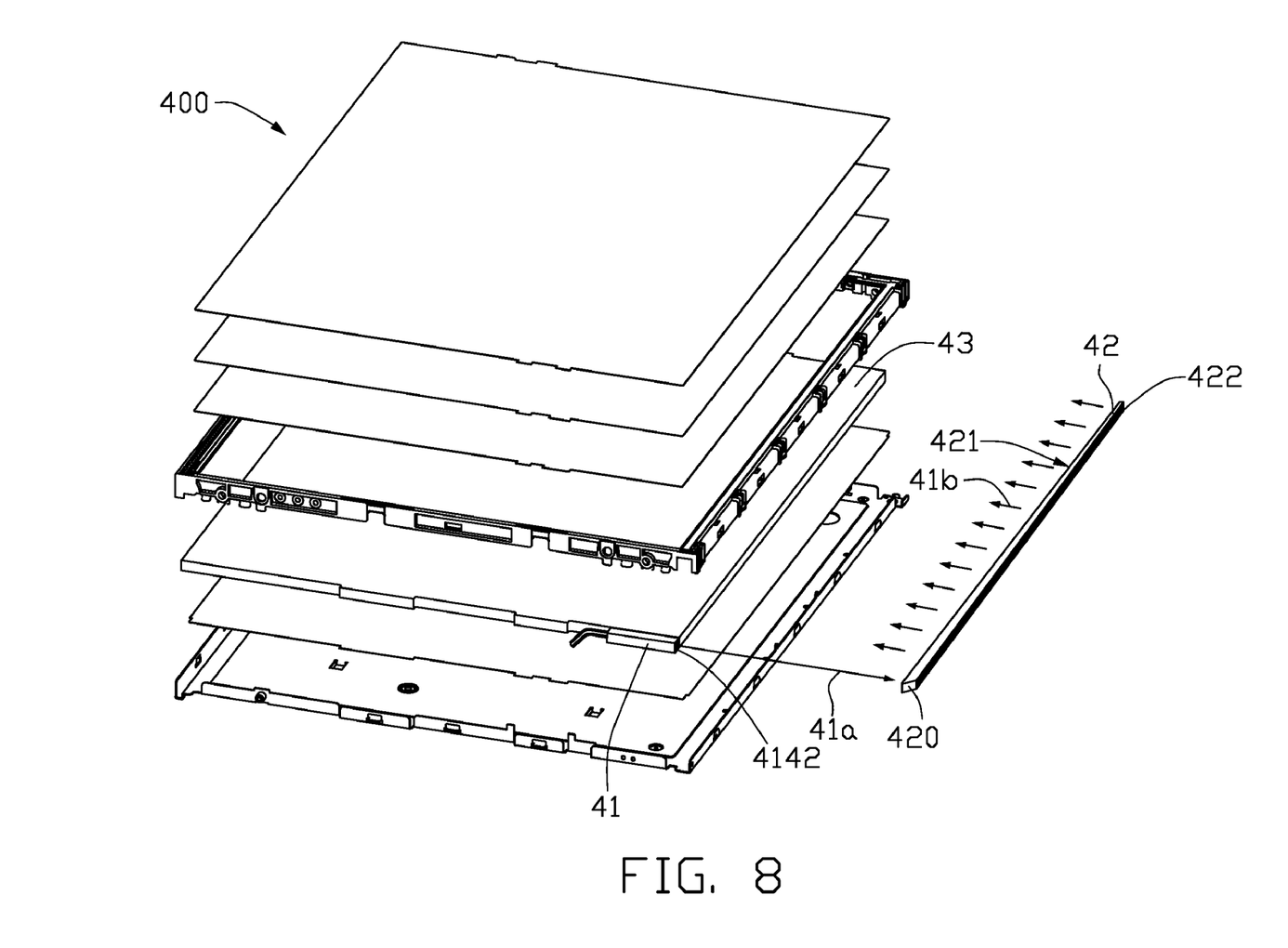
FIG. 8 is an exploded, isometric view of a backlight module according to a third preferred embodiment of the present invention.

Referring to FIG. 8, a backlight module 400, in accordance with a third preferred embodiment of the present invention, is similar in principle to the backlight module 300 of the second embodiment. However, an optical guiding device 41 of the backlight module 400 is positioned adjacent to one end of one side surface of a light guide plate 43; a light guide rod 42 is positioned adjacent to another adjacent side surface of the light guide plate 43. A light output opening 4142 of the optical guiding device 41 is in contact with the light guide rod 42. The light guide rod 42 is similar to the light guide rod 32, except that the light guide rod 42 has an inclined end surface 420 facing the light output opening 4142 of the optical guiding device 41. The inclined end surface 420 is a mirror surface for reflecting the laser beams 41*a* from the optical guiding device 41 towards light reflective surface 422 of the light guide rod 42. The laser beams 41*a* are reflected by the light reflective surface 422, and finally the laser beams 41*b* emit out from the light guide rod 42 via light emitting surface 421.

Figure 9:
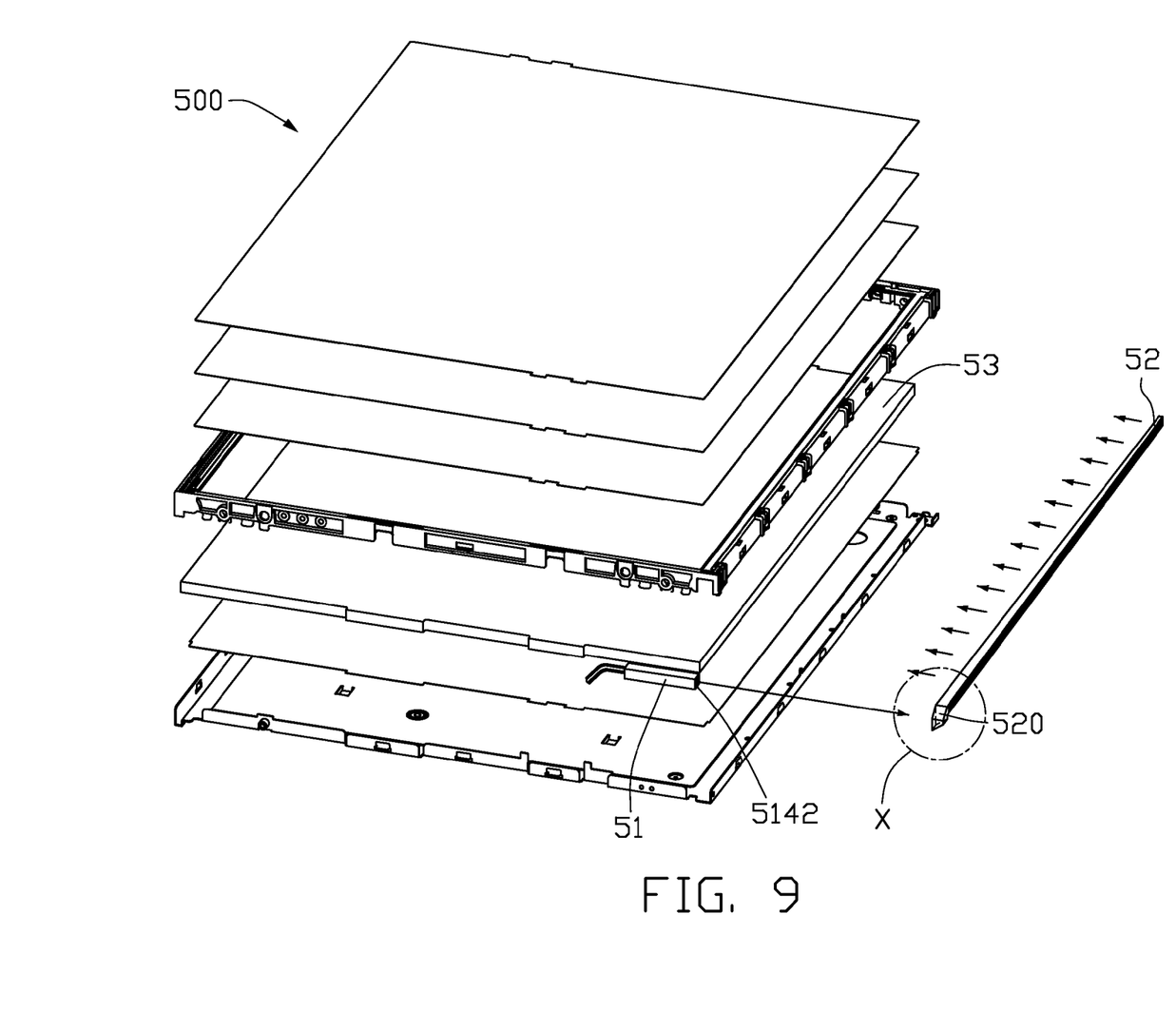
FIG. 9 is an exploded, isometric view of a backlight module according to a fourth preferred embodiment of the present invention.

Referring to FIG. 9, a backlight module 500, in accordance with a fourth preferred embodiment of the present invention, is similar in principle to the backlight module 400 of the third embodiment. However, an optical guiding device 51 of the backlight module 500 is disposed under a light guide plate 53 adjoining to one end of one side surface of the light guide plate 53; a light guide rod 52 further includes a multi-faced protuberance 520 extending from one end surface of the light guide rod 52. The light guide rod 52 is disposed near to adjacent side surface of the light guide plate 53.

Figure 10:
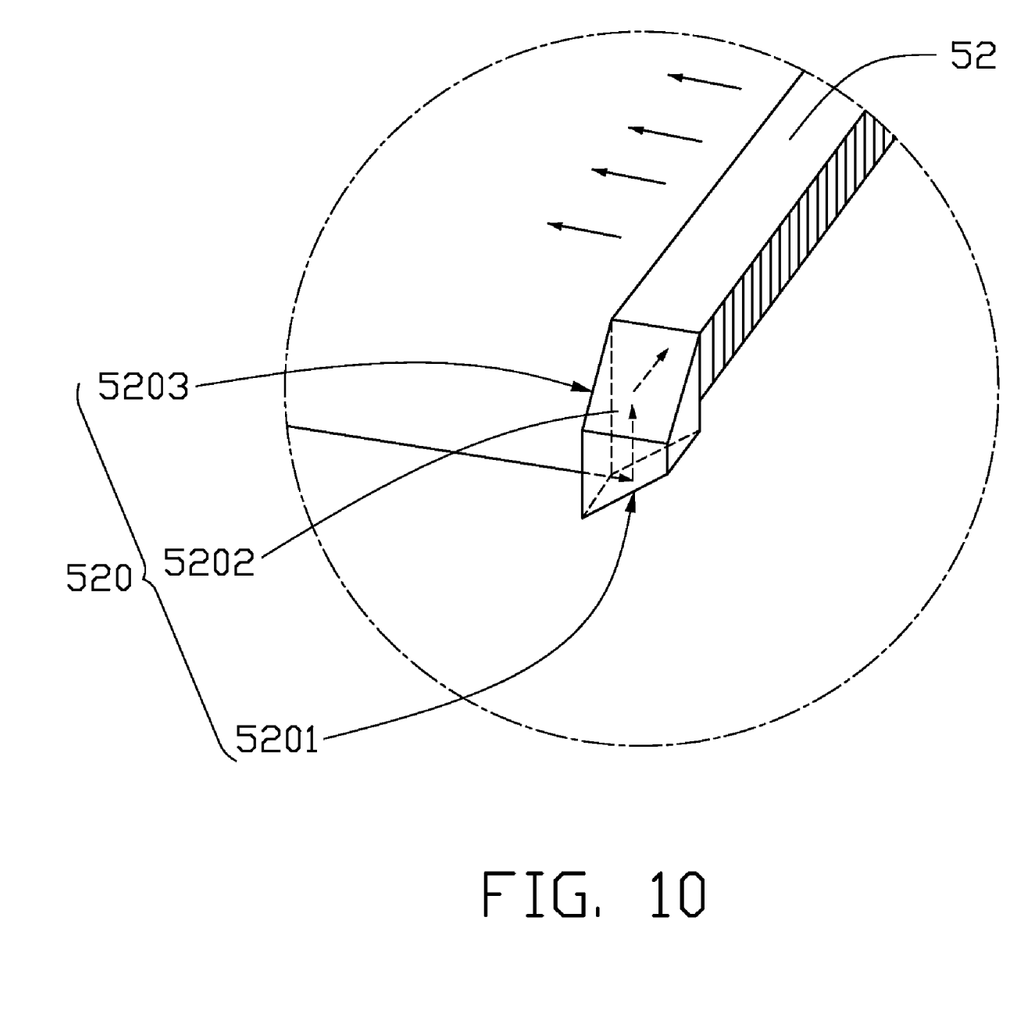
FIG. 10 is an enlarged view of a circle portion X of FIG. 9.

Referring to FIG. 10, the multi-faced protuberance 520 includes a trapeziform incident surface 5203, a first mirror surface 5201 and a second mirror surface 5202. The trapeziform incident surface 5203 is in contact with the optical guiding device 51. The first mirror surface 5201 faces the light output opening 5142 of the optical guiding device 51 and adjoins to the trapeziform incident surface 5203. The second mirror surface 5202 is opposite to the first mirror surface 5201. Light beams emitted from the optical guiding device 51 are introduced into the light guide rod 52 by being redirected at the first mirror surface 5201 and the second mirror surface 5202 in that order. It is should be noted that the optical guiding device 51, the light guide rod 52 are not positioned in a same plane.

Figure 11:
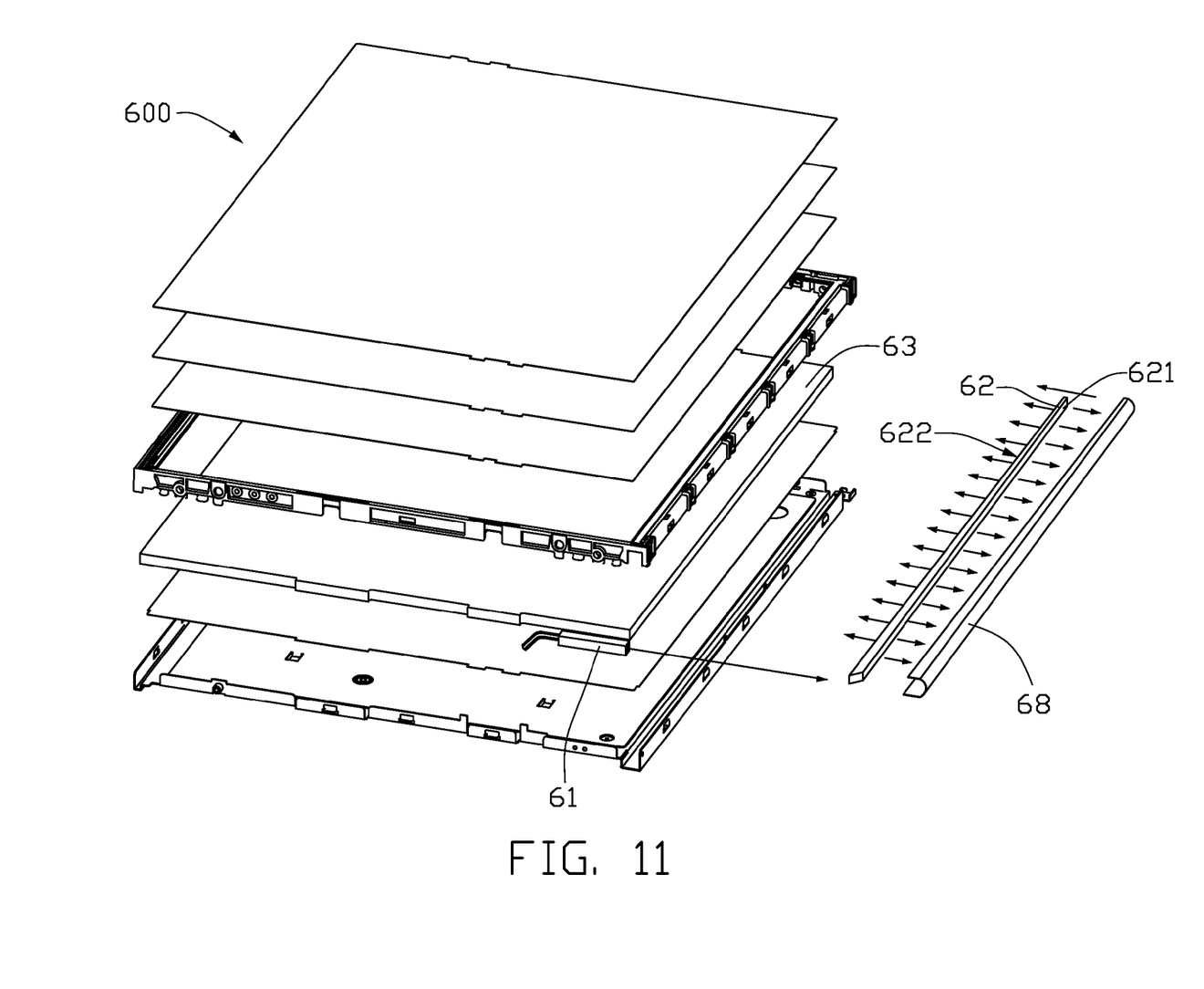
FIG. 11 is an exploded, isometric view of a backlight module according to a fifth preferred embodiment of the present invention.
Figure 12:
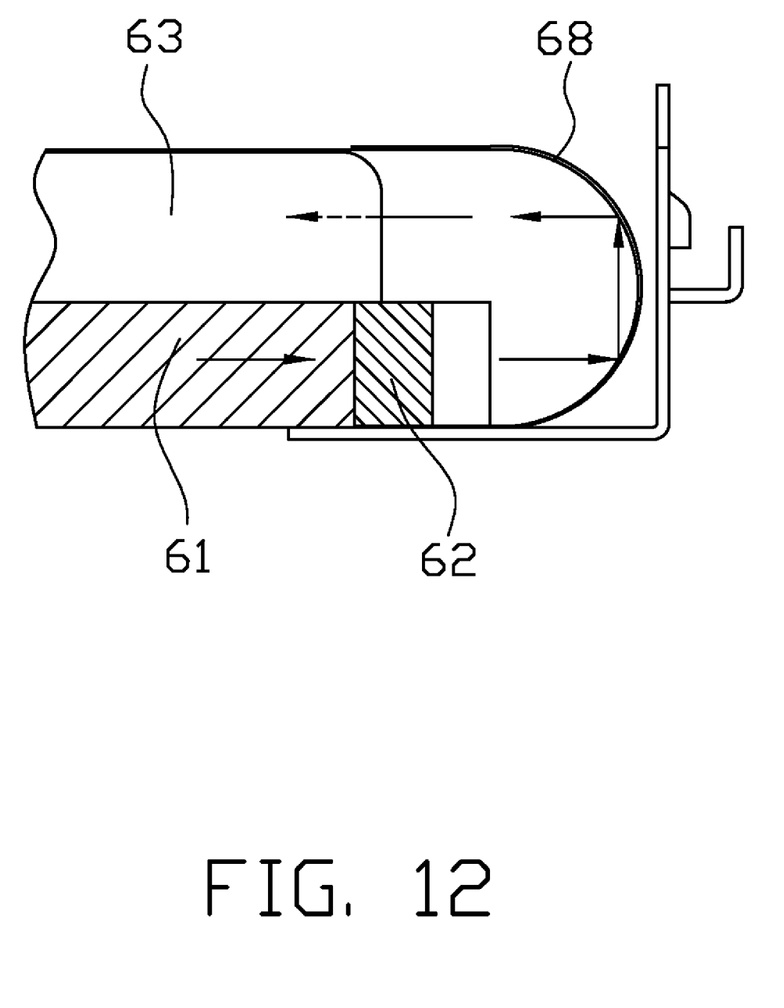
FIG. 12 is an abbreviated, assembled, cross-sectional view of the backlight module of FIG. 11.

Referring to FIGS. 11 and 12, a backlight module 600, in accordance with a fifth preferred embodiment of the present invention, is similar in principle to the backlight module 400 of the third embodiment. The backlight module 600 includes an optical guiding device 61, a light guide rod 62 and a light guide plate 63. However, the optical guiding device 61 and the light guide rod 62 are both positioned under the light guide plate 63, and both adjoin to bottom edges of adjacent side surface of the light guide plate 63. The optical guiding device 61 and the light guide rod 62 are in contact with each other. The backlight module further includes a reflector 68 that extends from a bottom surface of the light guide rod 62 to a top surface of the light guide plate 63. The reflector 68 is configured to reflect light beams from the light guide rod 62 into the light guide plate 63.

In the backlight modules 200, 300, 400, 500, 600, laser beams from the colored semiconductor lasers 20 can be mixed by the optical guiding device 21, 31, 41, 51, 61. Because the laser beams have excellent optical transmission property, the laser beams can be reflected and/or redirected into the light guide plate 23, 33, 43, 53, 63 by a light optical device such as rotating reflector apparatus 22 and light guide rods 32, 42, 52, 62. The backlight module has a good color performance due to the high color saturation and excellent light transmission of the laser beam.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. An optical guiding device, for optically coupling a plurality of light beams from at least one laser, comprising:
   at least one light coupling lens;
   at least one light collimating lens, the at least one light coupling lens and the at least one light collimating lens being positioned apart along an optical path; and
   at least one optical fiber according to the at least one laser beams, optically coupled to the at least one light couple lens, wherein the at least one light collimating lens is Fresnel lens; external laser beams, introduced by the at least one optical fiber, are optically coupled by the at least one light coupling lens, for collimating and mixing the light beams, then collimated by the at least one light collimating lens, and finally emitting out from the optical guiding device.

2. The optical guiding device according to claim 1, further comprising a casing having a light input opening and a light output opening, the light input opening and the light output opening being located at opposite ends of the casing.

3. The optical guiding device according to claim 2, wherein the at least one light coupling lens is supported by a lens support extending out from the casing adjacent to the light input opening, and the at least one collimating lens is supported by another lens support adjacent to the light output opening.

4. The optical guiding device according to claim 2, further comprising solid glue materials filled the space between the light output opening and the at least one light coupling lens, for fixing the optical fibers tightly.

5. A backlight module, comprising:
   a plurality of light sources having at least one colored semiconductor laser;
   a light guide plate;
   a light transferring device, wherein the light transferring device is selected from one of a rotating reflector apparatus and a light guide rod; and
   an optical guiding device, the optical guiding device including at least one light coupling lens, at least one light collimating lens, the at least one light coupling lens and the at least one light collimating lens positioned apart along an optical path, and at least one optical fiber according to the at least one laser beams optically coupled to the at least one light couple lens,
   wherein the optical guiding device and the light transferring device are position near the light guide plate; laser beam from the at least one colored semiconductor laser are optically coupled by the at least one light coupling lens for collimating and mixing the light beams, then collimated by the at least one light collimating lens, and finally are reflected and redirected by the light transferring device to enter the light guide plate.

6. The backlight module according to claim 5, wherein the rotating reflector apparatus comprises a multi-faced prism and a server motor, the server motor is configured for rotating the multi-faced prism at a predetermined rotation per minute.

7. The backlight module according to claim 6, wherein the multi-faced prism having multi reflective lateral faces that are selected from a group consisting of four-faced prism, eight-faced prism, six-faced prism and twelve-faced prism.

8. The backlight module according to claim 6, wherein the optical guiding device is disposed on one side surface of the light guide plate, and the rotating reflector apparatus are disposed in one corner, next to the side surface with the optical guiding device; the rotating multi-faced prism of the rotating reflector apparatus receives and redirects focused light beams from the optical guiding device into the light guide plate continuously.

9. The backlight module according to claim 5, wherein adjacent corners of the same side of the light guide plate defines a first cutout and a second cutout correspondingly; the first cutout is in the shape of an elongated rectangle, and the second cutout defines a curved-shaped corner; the rotating reflector apparatus is disposed in the second cutout and the optical guiding device is disposed in the first cutout facing the rotating reflector apparatus.

10. The backlight module according to claim 5, wherein the optical guiding device and the light guide rod are aligned in a line adjacent to one side surface of the light guide plate.

11. The backlight module according to claim 10, wherein the light guide rod is wedgy, and comprises a light incident surface, a light emitting surface, and a light reflective surface; the light incident surface is an end surface of the light guide rod; the light emitting surface adjoins to the light incident surface and faces one side surface of the light guide plate; the light reflective surface is opposite to the light emitting surface and also oblique with respect to the light emitting surface; a light output opening of the optical guiding device is in contact with light incident surface.

12. The backlight module according to claim 5, wherein the optical guiding device is positioned adjacent to one end of one side surface of a light guide plate, the light guide rod is positioned adjacent to another adjacent side surface of the light guide plate; a light output opening of the optical guiding device is in contact with the light guide rod.

13. The backlight module according to claim 12, wherein the light guide rod comprises an inclined end surface facing the light output opening of the optical guiding device, the inclined end surface is a mirror surface for reflecting the laser beams from the optical guiding device towards light reflective surface of the light guide rod.

14. The backlight module according to claim 5, wherein the optical guiding device is disposed under the light guide plate adjoining to one end of one side surface of the light guide plate, the light guide rod is positioned adjacent to another adjacent side surface of the light guide plate, the optical guiding device and the light guide rod are positioned in different plane.

15. The backlight module according to claim 14, wherein the light guide rod comprises a multi-faced protuberance extending from one end surface thereof, the multi-faced protuberance having a trapeziform incident surface, a first mirror surface and a second mirror surface opposite to the first mirror surface, the trapeziform incident surface being in contact with the optical guiding device, the first mirror surface facing the light output opening of the optical guiding device and adjoining to the trapeziform incident surface, light beams from the optical guiding device being introduced into the light guide rod by being redirected at the first mirror surface and the second mirror surface in that order.

16. The backlight module according to claim 5, wherein the optical guiding device and the light guide rod are both positioned under the light guide plate, and both adjoined to bottom edges of adjacent side surface of the light guide plate.

17. The backlight module according to claim 16, further comprising a reflector extending from a bottom surface of the light guide rod to a top surface of the light guide plate for reflecting light beams from the light guide rod into the light guide plate.

* * * * *